(12) United States Patent
Stollenwerk et al.

(10) Patent No.: US 10,842,320 B2
(45) Date of Patent: Nov. 24, 2020

(54) FLUE ASSEMBLY AND SPLASH BACK PANEL FOR A COOKING APPLIANCE

(71) Applicant: Alto-Shaam, Inc., Menomonee Falls, WI (US)

(72) Inventors: Thomas C. Stollenwerk, Mayville, WI (US); C. Philip Insisiengmay, Waukesha, WI (US); Jeremy J. Buford, Horicon, WI (US); George McMahon, Manchester, NH (US)

(73) Assignee: Alto-Shaam, Inc., Menomonee Falls, WI (US)

( * ) Notice: Subject to any disclaimer, the term of this patent is extended or adjusted under 35 U.S.C. 154(b) by 293 days.

(21) Appl. No.: 15/947,404

(22) Filed: Apr. 6, 2018

(65) Prior Publication Data

US 2018/0289217 A1 Oct. 11, 2018

Related U.S. Application Data

(60) Provisional application No. 62/482,909, filed on Apr. 7, 2017.

(51) Int. Cl.
*A47J 37/12* (2006.01)
*A47J 36/38* (2006.01)
*F24C 15/20* (2006.01)

(52) U.S. Cl.
CPC .......... *A47J 37/1276* (2013.01); *A47J 36/38* (2013.01); *F24C 15/20* (2013.01)

(58) Field of Classification Search
CPC .... A47J 37/12; A47J 37/1242; A47J 37/1247; A47J 37/1276

USPC ................ 26/391.1, 376.1; 126/391.1, 376.1
See application file for complete search history.

(56) References Cited

U.S. PATENT DOCUMENTS

| | | | | | |
|---|---|---|---|---|---|
| 1,289,842 | A | * | 12/1918 | McClees | A47J 37/1247 126/391.1 |
| 1,996,434 | A | * | 4/1935 | O'Dowd | A47J 37/1242 99/408 |
| 2,292,156 | A | * | 8/1942 | Pitman | A47J 37/1266 126/374.1 |
| 2,338,964 | A | * | 1/1944 | Pappas | A47J 37/1242 99/408 |
| 2,429,360 | A | * | 10/1947 | Kells | A47J 37/1247 126/391.1 |

(Continued)

OTHER PUBLICATIONS

Clipped portion of Eun M B, KR 1598513 B1, Mar. 2016 (Year: 2016).*

*Primary Examiner* — Jason L Vaughan
(74) *Attorney, Agent, or Firm* — Boyle Fredrickson S.C.

(57) ABSTRACT

The present invention provides a deep fat fryer separating the flue from the splash back panel and with a flue opening directed not upwardly, but rearwardly from the flue. By arranging the flue opening on the rear wall, the opening is protected from grease fallback (e.g., dripping from an overhead exhaust hood) or other foreign objects falling into the opening. The splash back panel further provides a seamless curved design that is easy to clean and also insulated from the heat of the flue. A baffle installed within the flue allows the combustion products to mix, cool, and slow upon exiting the baffle opening and entering the atmosphere reducing the exit temperature and also reducing the heating of the splash back panel.

20 Claims, 3 Drawing Sheets

(56) References Cited

U.S. PATENT DOCUMENTS

| | | | | |
|---|---|---|---|---|
| 2,433,134 A * | 12/1947 | Long | A47J 37/1247 | 126/391.1 |
| 2,452,472 A * | 10/1948 | Keating | A47J 37/1247 | 126/391.1 |
| 2,525,213 A * | 10/1950 | Doolin | A47J 37/1214 | 126/347 |
| 2,666,427 A * | 1/1954 | Keating | A47J 37/1247 | 126/391.1 |
| 2,712,308 A * | 7/1955 | Keating | A47J 37/1247 | 126/391.1 |
| 2,912,975 A * | 11/1959 | Del Francia | A47J 37/1242 | 126/391.1 |
| 2,983,261 A * | 5/1961 | Smith | F22B 9/04 | 122/155.1 |
| 3,018,716 A * | 1/1962 | Pass | A47J 37/1242 | 99/331 |
| 3,060,922 A * | 10/1962 | Christian | A47J 37/1247 | 126/391.1 |
| 3,416,509 A * | 12/1968 | Huebler | F24C 14/025 | 126/21 A |
| 3,760,793 A * | 9/1973 | Anetsberger | A47J 36/38 | 126/391.1 |
| 3,977,390 A * | 8/1976 | Fogel | A47J 37/1233 | 126/374.1 |
| 3,985,120 A * | 10/1976 | Lazaridis | A47J 27/17 | 126/390.1 |
| 3,990,433 A * | 11/1976 | Keating | A47J 37/1247 | 126/391.1 |
| 4,091,801 A * | 5/1978 | Lazaridis | A47J 27/17 | 126/378.1 |
| 4,102,330 A * | 7/1978 | Hutchinson | A47J 27/18 | 126/374.1 |
| 4,289,477 A * | 9/1981 | Moore | A47J 37/1247 | 126/369 |
| 4,297,987 A * | 11/1981 | Bushee | F24H 1/403 | 122/235.11 |
| 4,628,903 A * | 12/1986 | Farnsworth | F23C 15/00 | 126/343.5 A |
| 4,848,318 A * | 7/1989 | Brewer | A47J 37/1247 | 126/376.1 |
| 4,895,137 A * | 1/1990 | Jones | A47J 37/1247 | 126/391.1 |
| 5,033,368 A * | 7/1991 | Brewer | A47J 27/0817 | 99/403 |
| 5,038,753 A * | 8/1991 | Yokoyama | A47J 37/1252 | 126/391.1 |
| 5,050,582 A * | 9/1991 | Almond | A47J 37/1247 | 126/374.1 |
| 5,315,984 A * | 5/1994 | Bauer | F23J 13/00 | 126/307 R |
| 5,619,910 A * | 4/1997 | Farnsworth | A47J 37/0682 | 219/436 |
| 5,632,197 A * | 5/1997 | Lubawy | A47J 37/1247 | 99/403 |
| 5,819,638 A * | 10/1998 | Yokoyama | A47J 37/129 | 99/330 |
| 6,044,839 A * | 4/2000 | Furuhashi | A47J 37/1242 | 126/378.1 |
| 6,101,929 A * | 8/2000 | Saito | A47J 37/1266 | 126/391.1 |
| 6,178,964 B1 * | 1/2001 | McFadden | A47J 37/1242 | 126/391.1 |
| 6,192,880 B1 * | 2/2001 | Furuhashi | A47J 37/1242 | 126/357.1 |
| 6,374,821 B1 * | 4/2002 | Furuhashi | A47J 37/1247 | 126/376.1 |
| 6,736,131 B2 * | 5/2004 | Yamamoto | A47J 37/1247 | 126/376.1 |
| 6,758,209 B2 * | 7/2004 | Takeda | A47J 37/1247 | 126/373.1 |
| RE39,309 E * | 10/2006 | McNamara | A47J 37/1247 | 99/403 |
| 7,690,376 B1 * | 4/2010 | Tucci | A47J 37/1247 | 126/391.1 |
| 2002/0026875 A1 * | 3/2002 | Chikazawa | A47J 37/1285 | 99/403 |
| 2002/0096170 A1 * | 7/2002 | Takahashi | A47J 37/1223 | 126/391.1 |
| 2003/0034027 A1 * | 2/2003 | Yamamoto | A47J 37/1247 | 126/344 |
| 2005/0072418 A1 * | 4/2005 | McGowan | A47J 37/1223 | 126/391.1 |
| 2009/0007799 A1 * | 1/2009 | Hayakawa | A47J 37/128 | 99/403 |
| 2009/0084272 A1 * | 4/2009 | Chikazawa | A47J 37/1247 | 99/330 |
| 2009/0090352 A1 * | 4/2009 | Chikazawa | A47J 37/1252 | 126/391.1 |
| 2011/0048248 A1 * | 3/2011 | Manson | A47J 37/1247 | 99/403 |

* cited by examiner

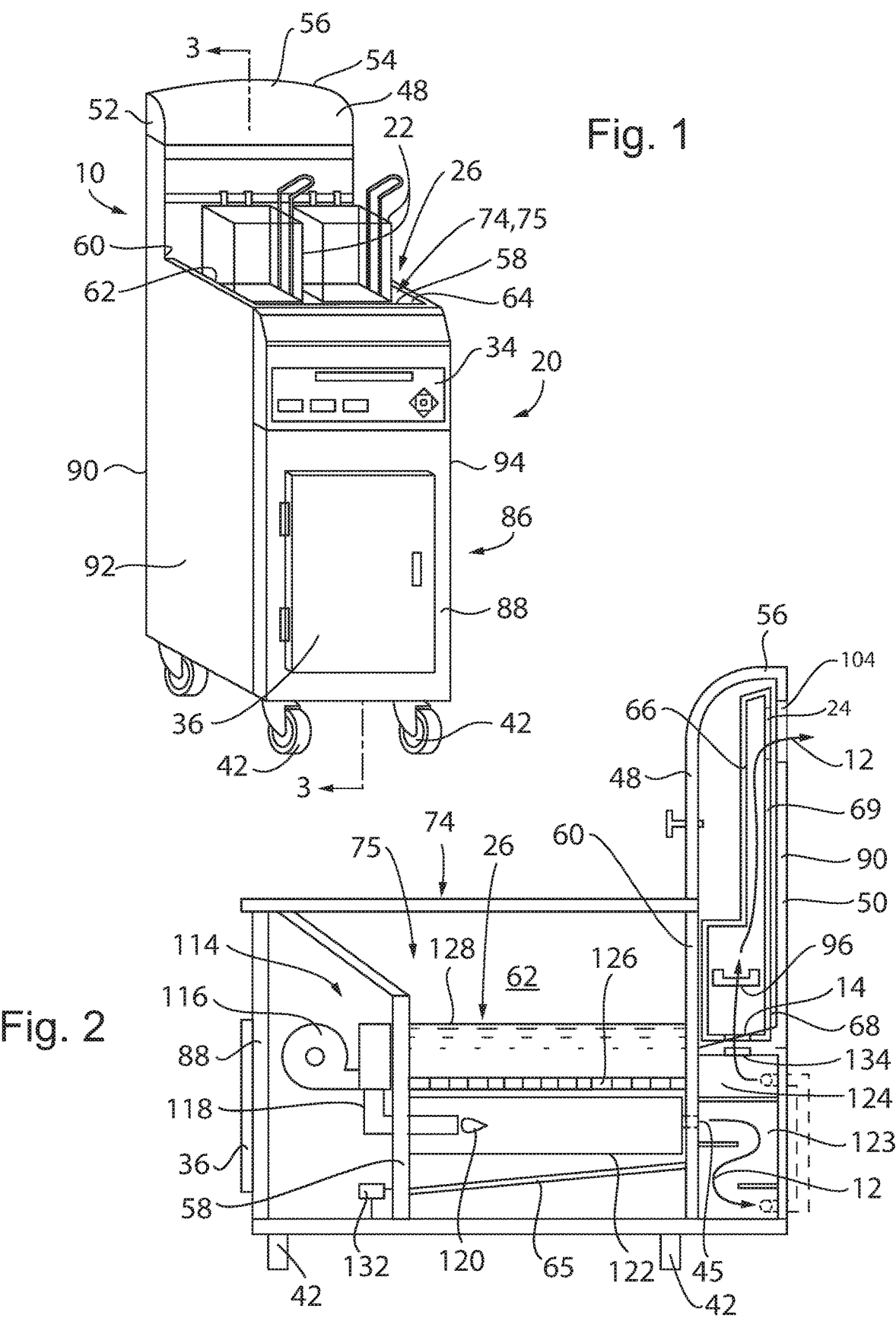

FLUE ASSEMBLY AND SPLASH BACK PANEL FOR A COOKING APPLIANCE

CROSS REFERENCE TO RELATED APPLICATION

This application claims the benefit of U.S. provisional application 62/482,909 filed Apr. 7, 2017 and hereby incorporated by reference.

STATEMENT REGARDING FEDERALLY SPONSORED RESEARCH OR DEVELOPMENT

BACKGROUND OF THE INVENTION

The present invention relates to a flue system for a cooking appliance using a gas burner such as a deep fat fryer, and in particular, to a flue assembly providing a splash-back panel of the cooking appliance and exhaust gases vented rearwardly.

Deep fat fryers, such as those commercially available under the trademark FryTech™ from Alto-Shaam®, Inc., located in Menomonee Falls, Wis. provide oil kettles heated by burners that are exhausted or vented by a flue at the rear of the fryer. The flue allows for directed movement of combustion products through the flue and out through a flue opening. The flue opening is typically positioned within a chimney extending upward at the rear of the fryer kettle or oil vat and to also provide a splash back panel blocking rear directed splashing from the kettles and a surface for supporting fryer baskets in a position where they can drain over the kettle.

SUMMARY OF THE INVENTION

While splash-back panels are meant to collect grease on the back wall behind the fryer kettle, the present inventors have recognized that maintenance associated with keeping the splash back panel clean is made difficult by high temperatures of the flue, which cause grease to "bake on" to the back wall when the splash back panel is the flue. Moreover, the upward flue opening exposes the flue to falling grease and other foreign objects, which may accidentally enter the flue. This is particularly a problem with fryers that use atmospheric burners employing convection to transport the flue gases (as opposed to power burners having blowers for transporting flue gases) because the flue opening is relatively large in order to facilitate the natural convection of air.

To address these problems, the present invention provides a deep fat fryer separating the flue from the splash back panel, and with a flue opening directed not upwardly, but rearwardly from the flue. By arranging the flue opening on the rear wall, the opening is protected from grease fallback (e.g., dripping from an overhead exhaust hood) or other foreign objects falling into the opening. The splash back panel further provides a seamless curved design that is easy to clean and also insulated from the heat of the flue. A baffle installed within the flue allows the combustion products to mix, cool, and slow upon exiting the baffle opening and entering the atmosphere reducing the exit temperature and also reducing the heating of the splash back panel.

In one embodiment, the present invention may be a food fryer having a housing with an equipment compartment adjacent a fryer tank having an upper opening and adapted to hold a volume of cooking fat for cooking therein and a splash-back wall displaced rearwardly from the fryer tank; a gas heater communicating with the fryer tank to heat the volume of cooking fat and producing exhaust gases; and an exhaust flue providing a passageway for the exhaust gases from a lower flue inlet to an upper flue outlet and having a chimney extending above and rearwardly from the fryer tank wherein the upper flue outlet opens toward a rear of the housing.

It is thus a feature of at least one embodiment of the present invention to vent hot air through a back of the fryer without heating the splash-back panel for ease of cleaning.

The upper flue outlet may be a hole positioned on a rear wall of the exhaust flue.

It is thus a feature of at least one embodiment of the present invention to eliminate a top vent opening allowing debris and food particles to fall within the exhaust flue.

The exhaust flue may comprise of an enclosed upper ceiling. The enclosed upper ceiling may be insulated. The enclosed ceiling may be angled rearwardly upward.

It is thus a feature of at least one embodiment of the present invention to facilitate removal of exhaust fumes through a rear opening in the flue.

The splash-back wall may be displaced from the exhaust flue to provide an air gap therebetween. The splash-back wall may extend over the exhaust flue to provide an upper covering. The upper covering of the splash-back wall may be curved. The upper covering of the splash-back wall may be insulated by batt insulation.

It is thus a feature of at least one embodiment of the present invention to maintain a smooth top for easy cleaning that is cool to the touch.

The lower inlet may be a plurality of air slots allowing exhaust gases to pass into the exhaust flue. At least some of the air slots provide fresh air intake from an exterior of the food fryer.

It is thus a feature of at least one embodiment of the present invention to circulate cool air into the flue gas stream, cooling the flue products to lower temperatures before exiting the flue.

A baffle plate may be positioned within the exhaust flue. The baffle plate may comprise of first and second wings oriented at an angle and forming a V-shape. The baffle plate may extend substantially an entire width of the exhaust flue.

It is thus a feature of at least one embodiment of the present invention to lower the exhaust gas temperature and velocity by mixing the air within the baffle.

The exhaust flue is defined by a first plenum and a second plenum wherein exhaust gases flow from the first plenum to the second plenum and the second plenum is spaced from the splash-back wall.

It is thus a feature of at least one embodiment of the present invention to rearwardly space the plenum from the splash-back panel to insulate the heat from the flue.

In one embodiment, the present invention may be a deep fat fryer having a housing providing a gas heater compartment separated from an adjacent oil vat wherein the oil vat holds a volume of frying fat for cooking having an upper opening accessible to a user and a splash-back panel displaced rearwardly from the oil vat; a shroud having a splash-back panel extending above and rearwardly from the oil vat; a heat exchanger positioned within the oil vat surrounded by the frying fat and providing an outer surface exposed to the frying fat opposite an inner surface defining an internal passage supporting a flow of heated gas therethrough the passage; and an exhaust flue defined by an enclosed passageway displaced rearwardly from the oil vat and receiving exhaust gases from the heat exchanger and having a lower inlet and an upper outlet providing a flow of exhaust gases from the inlet to the outlet wherein the outlet opens toward a rear of the housing.

It is thus a feature of at least one embodiment of the present invention to maintain the splash-back panel at a cool temperature for ease of cleaning and to prevent "baking-on" of grease.

The outlet may be a vertical hole formed in a rear wall of the exhaust flue.

The shroud may further include a curved ceiling extending over a top wall of the exhaust flue.

The shroud may be displaced from the exhaust flue to form a layer of air insulation therebetween. The space between the shroud and the exhaust flue may contain batt insulation.

These particular objects and advantages may apply to only some embodiments falling within the claims and thus do not define the scope of the invention.

BRIEF DESCRIPTION OF THE FIGURES

FIG. 1 is a perspective view of a deep fat fryer of the present invention having a flue assembly with a curved splash-back panel at a rear of the fryer;

FIG. 2 is a side elevation view of the deep fat fryer of FIG. 1 with the outer covering removed and the baskets removed from the fryer;

DETAILED DESCRIPTION OF THE PREFERRED EMBODIMENT

Figure 3:
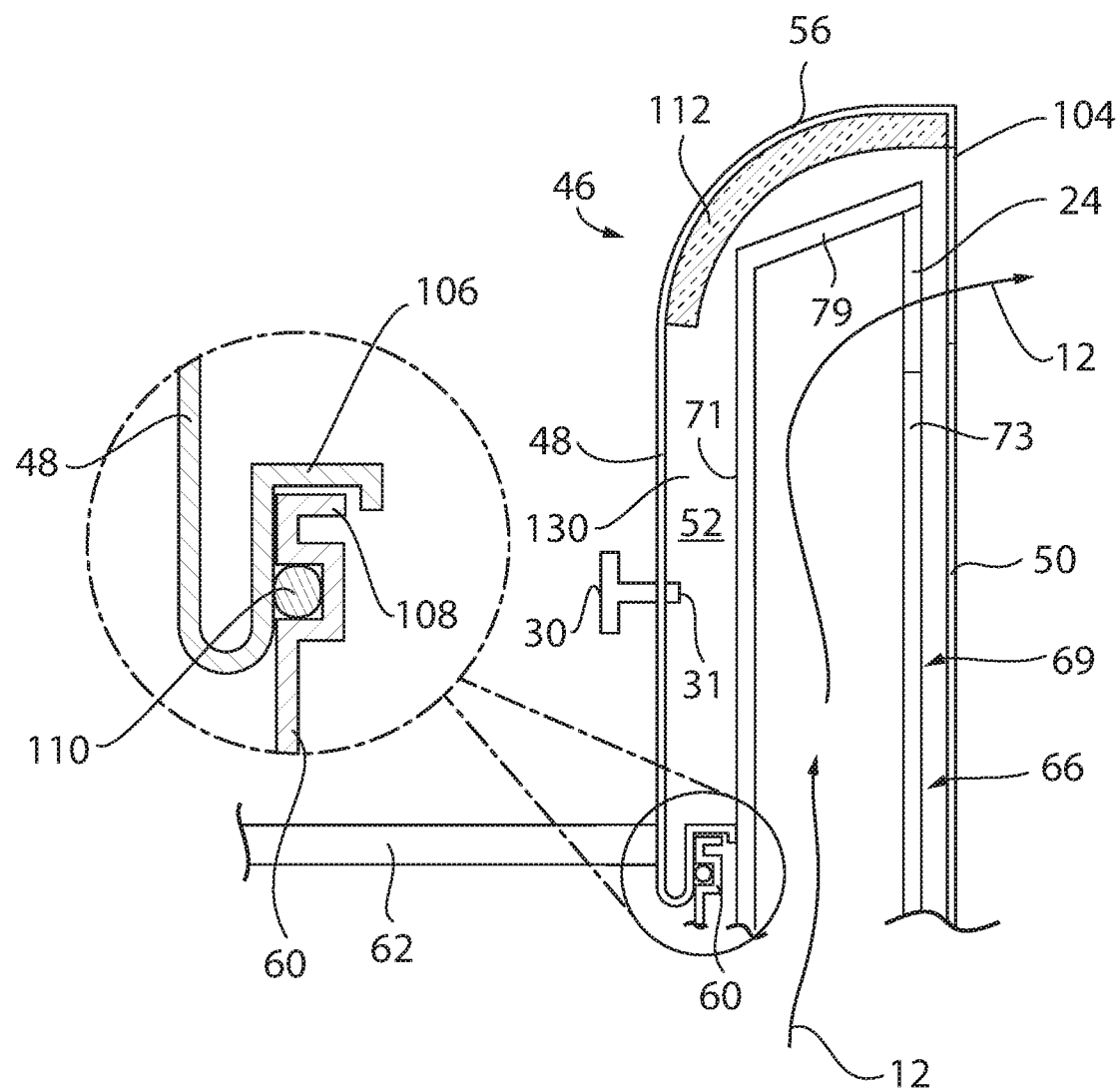
FIG. 3 is a cross sectional view of the deep fat fryer shown in FIG. 1 along line 3-3 with the inner plenum protected by an flue jacket.

Referring to FIGS. 1-2, a flue system 10 of the present invention may work with a deep fat fryer 20 of the type typically found in commercial kitchens. The fryer 20 may provide an outer main housing having an outer covering 86 being generally a rectangular cuboid having an upstanding front wall 88 in parallel opposition to an upstanding rear wall 90 both connected at their left and right edges by upstanding left 92 and right 94 walls respectively.

The front wall 88 of the fryer 20 may provide an exterior control panel 34 having a digital display and various control buttons for selection of on/off, power level, temperature selection, cooking modes, etc. At the front wall 88 below the control panel 34 may be a door 36 enclosing an opening of the front wall 88 providing access to an interior of the outer covering 86, holding, for example, equipment or electronics. The outer covering 86 may be stainless steel to prevent corrosion and high temperature resistant to prevent deformation under the high heat (e.g., 200 to 385 degrees Fahrenheit). The fryer 20 may be elevated and moveably supported by a plurality of casters 42 allowing the fryer 20 to roll along a floor.

The outer covering 86 provides an upper rectangular opening 74 allowing access to an oil vat 26 containing cooking oil 128 for frying foods. The oil vat 26 is defined by a front wall 58 in parallel opposition to a rear wall 60 connected at their left and right ends by left 62 and right 64 walls respectively. A wall 65 defines a floor of the oil vat 26. A drain valve 132 at a bottom of the oil vat 26 operated manually or by the electronic control, can close and open the lower outlet passageway. Actuating the valve 132 will allow oil 128 to pass through the lower passageway to drain the oil 128 from the oil vat 26.

A plurality of baskets 22 (e.g., two baskets are shown in FIG. 1) may be raised and lowered into an upper opening 75 of the oil vat 26, generally corresponding with the upper opening 74 of the outer covering 86, for frying the foods within the baskets 22. Basket supports 126 which extend between opposite walls of the oil vat 26 support the baskets 22 from below, while still allowing oil 128 to pass through the basket supports 126. The basket supports 126 may have holes, slots or comprise of rods to facilitate passage of the oil 128.

The cooking oil 128 may be heated by a heat exchanger such as a combustion appliance 114 providing a gas burner 118. The gas burner 118 may be an atmospheric (venturi) burner or a power burner, as shown, as generally understood in the art. The atmospheric (venturi) burner uses the natural movement of gas to mix with air while a power burner uses a mechanical blower 116 to deliver combustion air to a flame 120. The burner 118 directs the flame 120 through a plurality of heat tubes 122 which extend into the oil vat 26. The heat tubes 122 may be a stainless steel construction able to withstand heat within the tubes 122 and to conduct the heat into the surrounding cooking oil 128 at the outer surface of the heat tubes 122.

The exhaust gases 12 resulting from the combustion process of the combustion appliance 114 exits the heat tubes 122 at a tube outlet 45 at a lower, rear end of the fryer 20 proximate to the bottom wall 65 of the oil vat 26. Upon exiting the heat tubes 122, the exhaust gases may flow through a manifold of channels 123. The manifold of channels 123 may allow the exhaust gases to pass through various conduits extending along the exterior of sidewalls 62, 64 of the oil vat 26 so that the exhaust gases may continue to conduct heat through the sidewalls 62, 64 to the cooking oil 128. After several passes the cooled exhaust gases 12 pass through a turn box 124 before entering an exhaust flue 66 located at a rear of the fryer 20.

Figure 4:
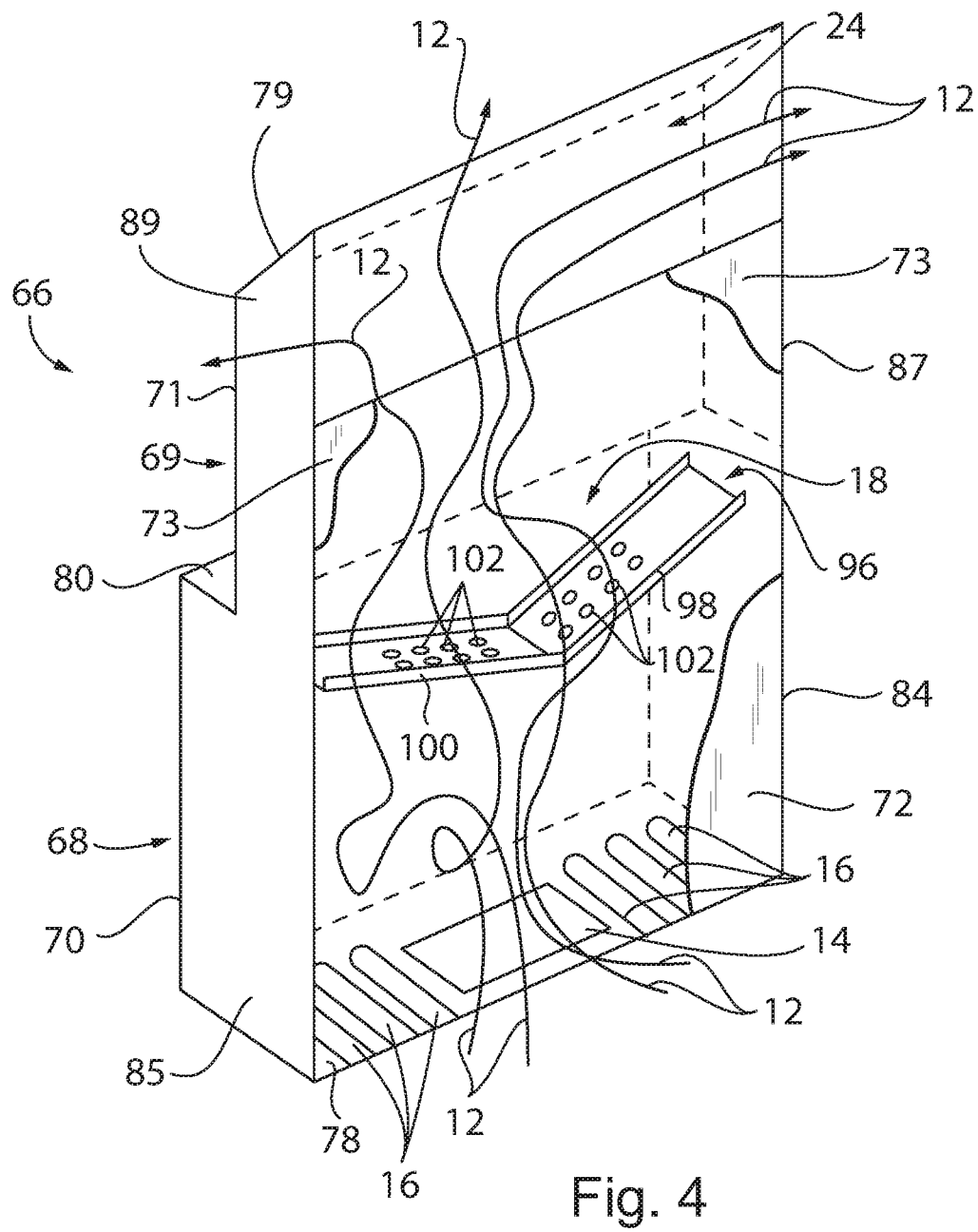
FIG. 4 is a perspective view, shown generally from a rear of the fryer of FIG. 1, of the inner plenum of the flue assembly with the flue jacket removed and a baffle within the plenum.

Referring to FIG. 4, the exhaust flue 66 is defined by a generally two-tiered plenum providing a first lower plenum 68 being generally a rectangular cuboid. The plenum provides a generally air-filled passage or space within the exhaust flue 66 structure. The lower plenum 68 structure provides a front wall 70 in parallel opposition to a rear wall 72 both connected at their left and right edges by left 84 and right 85 walls respectively. A wall 78 defines a floor of the lower plenum 68 where an exhaust opening 14 is substantially centered allowing the exhaust gases 12 to enter the lower plenum 68. The exhaust opening 14 may be a rectangular opening of approximately 6 inches by 1.4 inches or 8.4 square inches.

The exhaust opening 14 may be flanked by a plurality of air slots 16, which allow exterior atmospheric air or fresh air intake to also enter the lower plenum 68 and mix with the exhaust gases 12. The air slots 16 may be generally oblong shaped, although they can take any shape and/or configuration. The air slots 16 may extend laterally past the turn box 124 so that they are generally exposed to atmospheric air and are uncovered by any obstruction. A wall 80 defines a ceiling of the lower plenum 68 with an opening 18 oriented toward a rear of the wall 80 allowing passage of exhaust gases 12 upward into an upper plenum 69.

A second upper plenum 69 being generally a rectangular cuboid is connected to the top of the lower plenum 68. The upper plenum 69 structure provides a front wall 71 in parallel opposition to a rear wall 73 both connected at their left and right edges by left 87 and right 89 walls respectively. The lower edges of the sidewalls are coupled to the edges of opening 18 of wall 80 to allow communication between the upper 69 and lower 68 plenums. The rear wall 73 provides a rear opening 24 at a top end of the rear wall 73 allowing passage of exhaust gases 12 outward through the opening 24. The rear opening 24 may be a rectangular hole or opening formed within the stainless steel wall of approximately 12 inches by 0.93 inches or 11.16 square inches. A wall 79 defines an enclosed ceiling of the upper plenum 69. The wall 79 is angled upward toward the rear wall 73 so as to provide a tapered front surface. The wall 79 may be insulated, for example, by batts of fiberglass, mineral wool, cellulose, polyurethane foam, polystyrene and the like.

The upper plenum 69 has a generally narrower depth compared to the lower plenum 68 allowing the upper plenum 69 to be oriented toward a rear of the lower plenum 68 so that the rear wall 72 and rear wall 73 generally align but the front wall 71 of the upper plenum 69 is generally set rearwards with respect to the front wall 70 so as to provide an air gap 130 in front of the front wall 71. This air gap 130 may provide an insulating affect as will be further described below. The second upper plenum 69 may have a smaller volume and cross-sectional area than the lower plenum 68.

The exhaust flue 66 may be stainless steel to prevent corrosion and high temperature resistant to prevent deformation under the high heat (e.g., 200 to 385 degrees Fahrenheit).

Installed within the lower plenum 68 is a baffle plate 96 used to assist with lowering the exhaust gas temperature and velocity. The baffle plate 96 provide first 98 and second 100 rectangular plates connected at their lower edges and angled to extend outward and upward within the lower plenum 68 to form a V-shape. The baffle plate 96 extends substantially the entire length and width of the lower plenum 68 to capture all the air flowing through. The baffle plate 96 contains a plurality of small round holes 102 disposed within the surface of the plates 98, 100 to allow the exhaust gases 12 to pass therethrough and may be oriented to direct the exhaust gases 12 in an outward direction.

Referring to FIG. 3, an outer flue jacket 46 covers the exhaust flue 66. The flue jacket 46 provides a front splash-back panel or wall 48 in parallel opposition to a rear wall 50 connected at their left and right ends by left 52 and right 54 walls respectively. The rear wall 50 provides a rear opening 104 at a top of the rear wall 50 generally greater in size than the rear opening 24 of the rear wall 73 of the upper plenum 69 but corresponding in position so that the openings are generally aligned. In one embodiment, the rear wall 50 may be omitted.

An upper wall 56 of the flue jacket 46 defines a seamless curved ceiling of the flue jacket 46 curving upward and bowing outward from the front splash-back wall 48 toward the rear wall 50. In an alternative embodiment, the wall 56 is flat and provided at a straight upward angle instead of curved.

An exterior front surface of the splash-back wall 48 may provide a hanger 30 for hanging the baskets 22 thereon. The hanger 30 may be hooks or brackets screw-attached to the splash-back panel 48, such as by nuts and bolts 31. The hanger 30 retains a lip or edge of the baskets 22 and assists to hold the baskets 22 above the cooking oil and oil vat 26.

The outer flue jacket 46 is installed over the exhaust flue 66 with watertight sealed connections between the outer flue jacket 46 and the oil vat 26. The connection of the splash-back wall 48 and the oil vat 26 may be made with a U-shaped bracket 106 at a lower end of the front splash-back wall 48 extending over an upper end 108 of the oil vat rear wall 60. A rope gasket 110 may extend between the bracket 106 and an outer surface of the upper end 108 to seal the connection of the bracket 106 and the oil vat rear wall 60. It is understood that other sealing methods may be used to provide a watertight seal between the flue jacket 46 and the oil vat 26.

The exhaust flue 66 is positioned within outer flue jacket 46 so that the front splash-back wall 48 is spaced from the front wall 71 of the upper plenum 69. The air gap 130 in front of the front wall 71 of the upper plenum 69 provides an insulating air layer between the exhaust flue 66 and the front splash-back wall 48 to keep the splash-back wall 48 a cool temperature to the touch. Moreover, a layer of insulation 112 may be installed at wall 56, between wall 56 and wall 79 of the upper plenum 69, to further protect the wall 56 from excessive heat. Insulation may be formed along any wall of the flue jacket 46 in a similar manner to protect the walls from excessive heat emanating from the exhaust flue 66. The insulation may be batts of fiberglass, mineral wool, cellulose, polyurethane foam, polystyrene and the like.

In operation, the exhaust gases 12 travel from the combustion appliance 114 through a constricted exhaust hole 134 of the turn box 124 before entering the exhaust flue 66. As the exhaust gases 12 exit the constricted exhaust hole 134 of the turn box 124, the "venturi effect" results in an increase in velocity of the gases, propelling the gases through the flue 66. The flue system 10 assists to slow the velocity and cool the gases before ultimately exiting the fryer 20.

The higher velocity exhaust gases 12 enter the lower plenum 68 through the exhaust opening 14. The exhaust gases 12 may then mix with the intake air entering the air slots 16 also at the bottom wall 78 of the lower plenum 68 to cool the exhaust gases 12. The exhaust gases 12 travel upward to pass through the holes 102 of the baffle plate 96. The angle of the first and second plates 98, 100 causes the exhaust gas 12 to mix, and the holes 102 direct the gases outwards to diffuse the gases 12 over the entire area of the plenum 68. The baffle plate 96 also assist to lower the velocity of the gases 12 by slowing down the movement of the gases.

The exhaust gases 12 continue to pass to the upper plenum 69. The gases 12 travel upward to impinge the top wall 79 of the upper plenum 69 and are diverted through the opening 24 at the rear wall 73 of the upper plenum 69 toward a rear of the fryer 20. The exhaust gases 12 may continue past the rear opening 104 of the rear wall 50 of the outer flue jacket 46 to exit the fryer 20 and enter the surrounding exterior atmosphere at a rear of the fryer 20. The velocity and temperature of the exiting gases 12 are substantially reduced by the flue assembly 10.

The user may easily clean the outer surfaces of the outer flue jacket 46 which remain insulated from the exhaust flue 66 to keep a cooler temperature and minimize the "baking on" of grease to the surface. The seamless curved ceiling of wall 56 allows the surface to be easily wiped down by the user.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A food fryer comprising:
   a housing having an equipment compartment adjacent a fryer tank having an upper opening and adapted to hold a volume of cooking fat for cooking therein and a splash-back wall displaced rearwardly from the fryer tank;
   a gas heater communicating with the fryer tank to heat the volume of cooking fat and producing exhaust gases; and
   an exhaust flue providing a passageway for the exhaust gases from a lower flue inlet to an upper flue outlet and having a chimney extending above and rearwardly from the fryer tank wherein the upper flue outlet opens toward a rear of the housing
   wherein the splash-back wall is displaced from the exhaust flue by a space and the space between the splash-back wall and the exhaust flue contains batt insulation.

2. The food fryer of claim 1 wherein the upper flue outlet is a hole positioned on a rear wall of the exhaust flue.

3. The food fryer of claim 1 wherein the exhaust flue comprises an enclosed upper ceiling.

4. The food fryer of claim 3 wherein the enclosed upper ceiling is insulated.

5. The food fryer of claim 4 wherein the enclosed ceiling is angled rearwardly upward.

6. The food fryer of claim 1 wherein the splash-back wall is displaced from the exhaust flue to provide an air gap therebetween.

7. The food fryer of claim 6 wherein the splash-back wall extends over the exhaust flue to provide an upper covering.

8. The food fryer of claim 7 wherein the upper covering of the splash-back wall is curved.

9. The food fryer of claim 8 wherein the upper covering of the splash-back wall is insulated by batt insulation.

10. The food fryer of claim 1 wherein the lower inlet is a plurality of air slots allowing exhaust gases to pass into the exhaust flue.

11. The food fryer of claim 10 wherein at least some of the air slots provide fresh air intake from an exterior of the food fryer.

12. The food fryer of claim 1 further comprising a baffle plate positioned within the exhaust flue.

13. The food fryer of claim 12 wherein the baffle plate comprises first and second wings oriented at an angle and forming a V-shape.

14. The food fryer of claim 13 wherein the baffle plate extends substantially an entire width of the exhaust flue.

15. The food fryer of claim 1 wherein the exhaust flue is defined by a first plenum and a second plenum wherein exhaust gases flow from the first plenum to the second plenum and the second plenum is spaced from the splash-back wall.

16. A deep fat fryer comprising:
    a housing providing a gas heater compartment separated from an adjacent oil vat wherein the oil vat holds a volume of frying fat for cooking having an upper opening accessible to a user;
    a shroud having a splash-back panel extending above and rearwardly from the oil vat;
    a heat exchanger positioned within the oil vat surrounded by the frying fat and providing an outer surface exposed to the frying fat opposite an inner surface defining an internal passage supporting a flow of heated gas therethrough the passage; and
    an exhaust flue defined by an enclosed passageway displaced rearwardly from the oil vat and receiving exhaust gases from the heat exchanger and having a lower inlet and an upper outlet providing a flow of exhaust gases from the inlet to the outlet wherein the outlet opens toward a rear of the housing
    wherein the shroud is displaced from the exhaust flue by a space and the space between the shroud and the exhaust flue contains batt insulation.

17. The food fryer of claim 16 wherein the outlet is a vertical hole formed in a rear wall of the exhaust flue.

18. The deep fat fryer of claim 17 wherein the shroud further comprises a curved ceiling extending over a top wall of the exhaust flue.

19. The deep fat fryer of claim 18 wherein the shroud is displaced from the exhaust flue to form a layer of air insulation therebetween.

20. A deep fat fryer comprising:
    a housing providing a gas heater compartment separated from an adjacent oil vat wherein the oil vat holds a volume of frying fat for cooking having an upper opening accessible to a user and a splash-back panel displaced rearwardly from the oil vat;
    a shroud having a splash-back panel extending above and rearwardly from the oil vat;
    a heat exchanger positioned within the oil vat surrounded by the frying fat and providing an outer surface exposed to the frying fat opposite an inner surface defining an internal passage supporting a flow of heated gas therethrough the passage; and
    an exhaust flue defined by an enclosed passageway displaced rearwardly from the oil vat and receiving exhaust gases from the heat exchanger and having a lower inlet and an upper outlet providing a flow of exhaust gases from the inlet to the outlet wherein the outlet opens toward a rear of the housing
    wherein the outlet is a vertical hole formed in a rear wall of the exhaust flu
    wherein the shroud further comprises a curved ceiling extending over a top wall of the exhaust flue wherein the shroud is displaced from the exhaust flue to form a layer of air insulation therebetween
wherein a space between the shroud and the exhaust flue contains batt insulation.

* * * * *